United States Patent [19]
Ridings et al.

[11] Patent Number: 5,113,977
[45] Date of Patent: May 19, 1992

[54] LIFT TRUCK PARKING BRAKE

[75] Inventors: James R. Ridings, Glenmoore; Anh M. Nguyen, Landisville, both of Pa.

[73] Assignee: Strato-Lift, Inc., Morgantown, Pa.

[21] Appl. No.: 629,455

[22] Filed: Dec. 18, 1990

[51] Int. Cl.⁵ .................................................. B62C 7/02
[52] U.S. Cl. ..................................... 188/69; 188/21; 188/22; 188/31; 280/47.27
[58] Field of Search ............... 188/1.12, 19, 20, 21, 188/22, 31, 60, 69, 71.1, 265; 280/47.27, 149.2; 180/19.1, 19.3

[56] References Cited

U.S. PATENT DOCUMENTS

| | | | |
|---|---|---|---|
| 1,331,513 | 2/1920 | Lindberg | 188/20 |
| 3,698,504 | 10/1972 | Harvey | 188/72.9 |
| 3,907,138 | 9/1975 | Rhodes | 188/83 |
| 4,819,767 | 4/1989 | Laird | 188/21 |
| 4,838,578 | 6/1989 | Baxter | 280/149.2 |

FOREIGN PATENT DOCUMENTS

| | | | |
|---|---|---|---|
| 150387 | 8/1920 | Belgium | 188/31 |
| 522260 | 3/1921 | France | 188/31 |

Primary Examiner—Robert J. Oberleitner
Assistant Examiner—Chris Schwartz
Attorney, Agent, or Firm—Dann, Dorfman, Herrell & Skillman

[57] ABSTRACT

An improved parking brake is provided for use on a movable machine, in particular a lift truck with an elevating platform. A pin-type brake is provided with a buffered slide mechanism which engages and disengages a slotted disc mounted on a wheel to brake the machine while not in use. The buffered slide mechanism provides a delay for the slide mechanism when the slide and apertures in the slotted disc are not in precise alignment, and automatically engages or disengages the brake when the slide and disc apertures are in alignment. The brake also reduces wear on the internal cylinder components by providing a slide supported at its ends by guides and pivotally linked to the cylinder mechanism.

13 Claims, 4 Drawing Sheets

LIFT TRUCK PARKING BRAKE

FIELD OF THE INVENTION

The present invention relates to a parking brake for use on a movable machine. An improved pin brake assembly with a spring-loaded buffer is easily engaged and disengaged and reduces wear on its internal components. The present invention is particularly useful for use on a lift truck operating in areas where the lift truck may be parked on an incline.

BACKGROUND OF THE INVENTION

Lift trucks are commonly used in many industries and under many conditions. They are generally used for elevating and carrying a wide variety of objects from one place to another. Often the lift truck must be parked while the operator or other workers manipulate the load. If the lift truck is parked on level ground, the weight of the lift truck and the frictional force between the tires and ground combine to make the lift truck substantially immovable. However, if the lift truck is parked on an incline, a parking brake must be applied for safe manipulation of the load, or storage of the lift truck while not in use.

Several different types of brakes are provided in the prior art for parking a lift truck. Drum brakes, caliper brakes, hydraulic spring brakes, and various designs of pin brakes are among the types of brakes commonly used. Each of these designs has unsatisfactory characteristics due to its complexity, cost of construction, or high maintenance requirements.

One type of pin brake provided in the prior art has an hydraulic cylinder stroke which pushes the ram or piston shaft through a slotted disc or wheel designed to receive the shaft on a number of positions on the disc or wheel. The slotted disc or wheel may only receive the shaft in a number of discrete positions in its rotation, i.e. when the center of the shaft is in line with the center of the slots or openings of the disc or wheel.

Pin brakes provided in the prior art have at least two significant problems. When the shaft and brake disc are engaged but not precisely aligned, a severe radial load is created on the shaft. This severe radial load causes premature wear of the internal cylinder seals. Also, when the shaft is engaged with the brake disc and the lift truck is parked on an incline, a very high frictional force is created on the shaft by the brake disc. An equally large force is required to retract the shaft and disengage the brake. As a result, very high pressure in the hydraulic unit is required to retract the shaft and disengage the brake. This type of design is complex and expensive to build.

Manually operated pin brakes provided in the prior art have problems similar to hydraulically operated pin brakes. For example, to release a manual parking brake engaged while the lift truck is parked on an incline, the lift operator must simultaneously move the fork lift up the incline by operating the travel mode, and then release the parking brake at the movement the shaft and brake disc are in precise alignment.

Another prior art parking device provides an hydraulic spring brake coupled to a wheel drive motor. The brake is automatically applied by a spring when the travel mode of the truck is arrested and the brake is released hydraulically when the travel mode is resumed. Since this brake requires low operating pressure, a pressure-reducing valve and shuttle valve are necessary to operate the brake properly. Additionally, if the operator arrests the travel mode during operations, the hydraulic spring brake is automatically applied resulting in a jerking motion of the lift. To prevent jerking, a flow control valve must be mounted on the brake return line, thereby adding to the cost and complexity of the brake system.

SUMMARY OF THE INVENTION

The present invention provides an improved parking brake for movable machines and is particularly adapted to a lift truck. The present invention is an improvement over the prior art since its internal components are buffered for easy engagement and disengagement of the parking brake. Additionally, the parking brake is also inexpensive to manufacture and has low maintenance and field adjustment requirements.

More specifically, the present invention provides a parking brake comprising a buffered pin brake assembly, either a manual or hydraulic brake actuator assembly, and a disc brake assembly. The buffered pin brake assembly reduces wear on the pin brake shaft and internal cylinder components. The buffered pin brake assembly also provides an improved engaging and disengaging mechanism particularly useful when the lift truck is parked on an incline.

A disc brake assembly is provided on the wheel of the lift truck while a pin brake assembly is provided on the chassis frame of the lift truck close to the disc brake assembly. The disc brake assembly comprises a slotted disc mounted on the wheel of the lift truck. The pin brake assembly comprises a spring-loaded straight sliding bar supported on the chassis. The slotted disc is designed to receive the sliding bar in discrete positions to brake the lift truck. The brake actuator assembly used to engage and disengage the parking brake comprises an actuator bar, connected through linkage to the pin brake assembly, for sliding the brake pin into and out of engagement with the disc brake assembly.

The present invention remedies many of the problems existing in prior art pin brake assemblies. It is simple in design and operation and may be applied to movable machines other than a lift truck.

BRIEF DESCRIPTION OF THE DRAWINGS

A preferred structure and example of the invention are more fully set forth hereinafter with reference to the accompany drawings, wherein.

DESCRIPTION OF THE PREFERRED EMBODIMENTS

Figure 1:
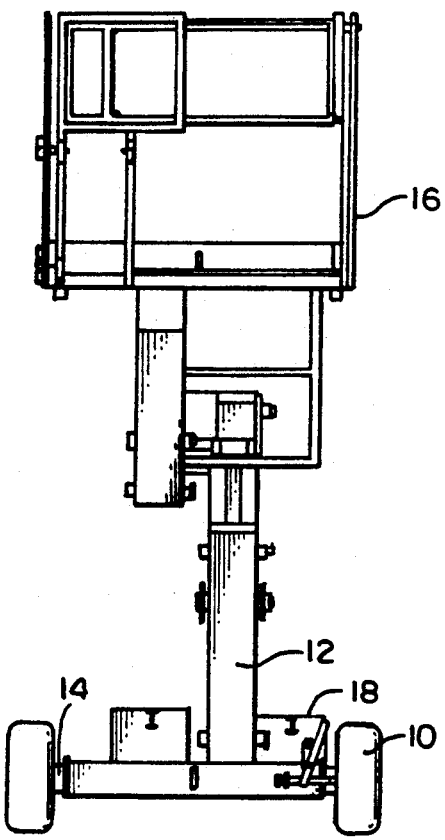
FIG. 1 is a front elevational view of a lift truck embodying a parking brake according to the present invention.
Figure 8:
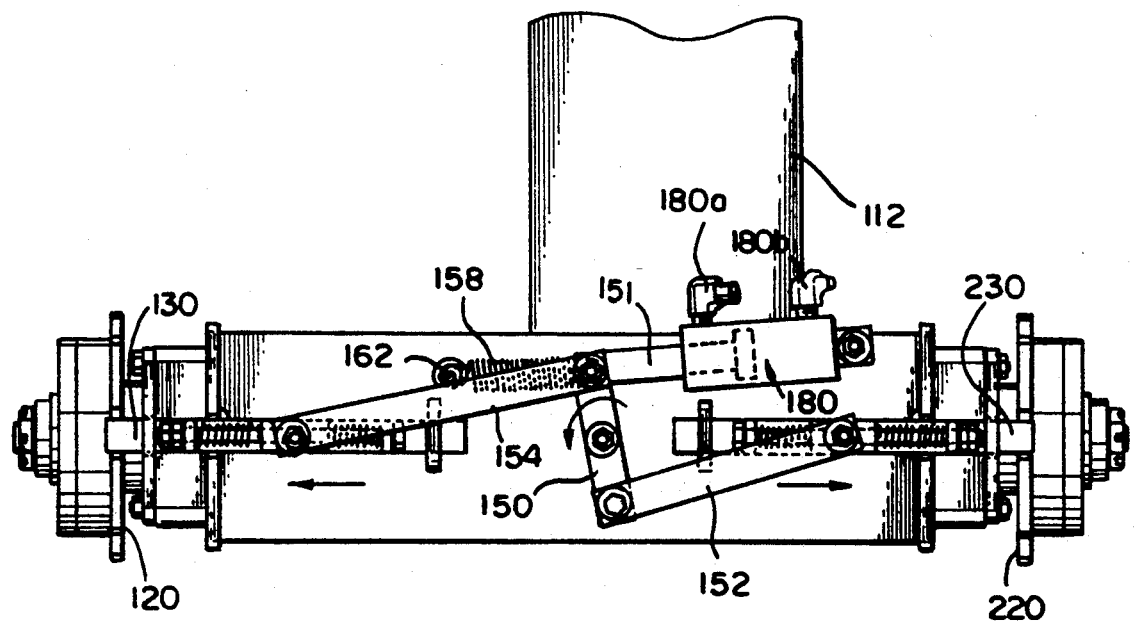
FIG. 8 is a fragmentary front view of a lift truck chassis embodying a hydraulically-activated dual parking brake according to the invention having two slides engaged with two slotted discs.
Figure 9:
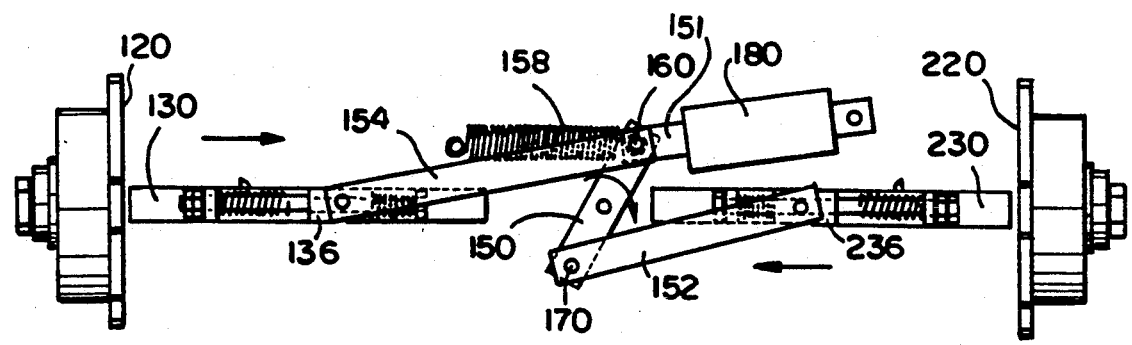
FIG. 9 is a diagrammatic view of the hydraulically-activated dual parking brake of FIG. 8 showing the slides disengaged from the slotted discs.

Referring now in greater detail to the drawings, the invention provides a parking brake designed for parking and braking movable machines. The parking brake is particularly adapted for use with a lift truck having a chassis 12 with an elevating platform 16. The parking brake is located in front of the chassis 12 parallel to the axle 14 supporting the wheels 10 of the lift truck and near the drive means 18, as shown in FIG. 1. The parking brake may be located near the wheels on either side of the chassis or may comprise a dual parking brake located near the wheels on both sides of the chassis, as shown in FIGS. 8 and 9.

Figure 2:
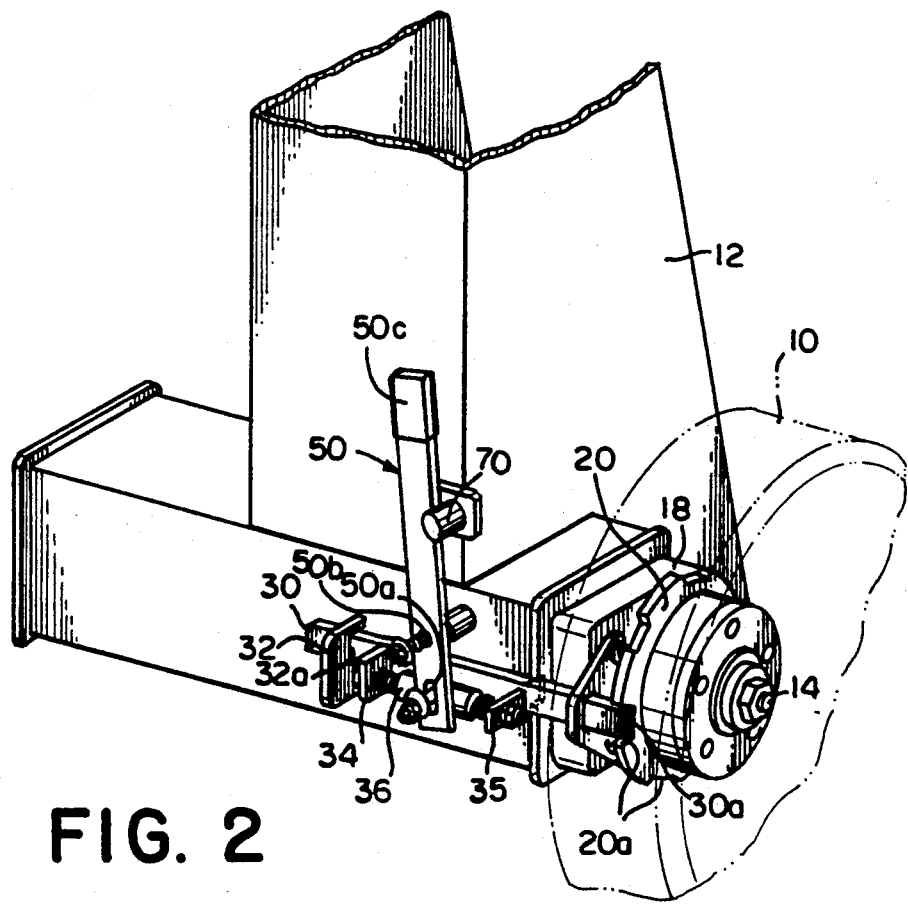
FIG. 2 is an enlarged fragmentary perspective view of a lift truck chassis and wheel (shown in phantom) embodying the parking brake.
Figure 3:
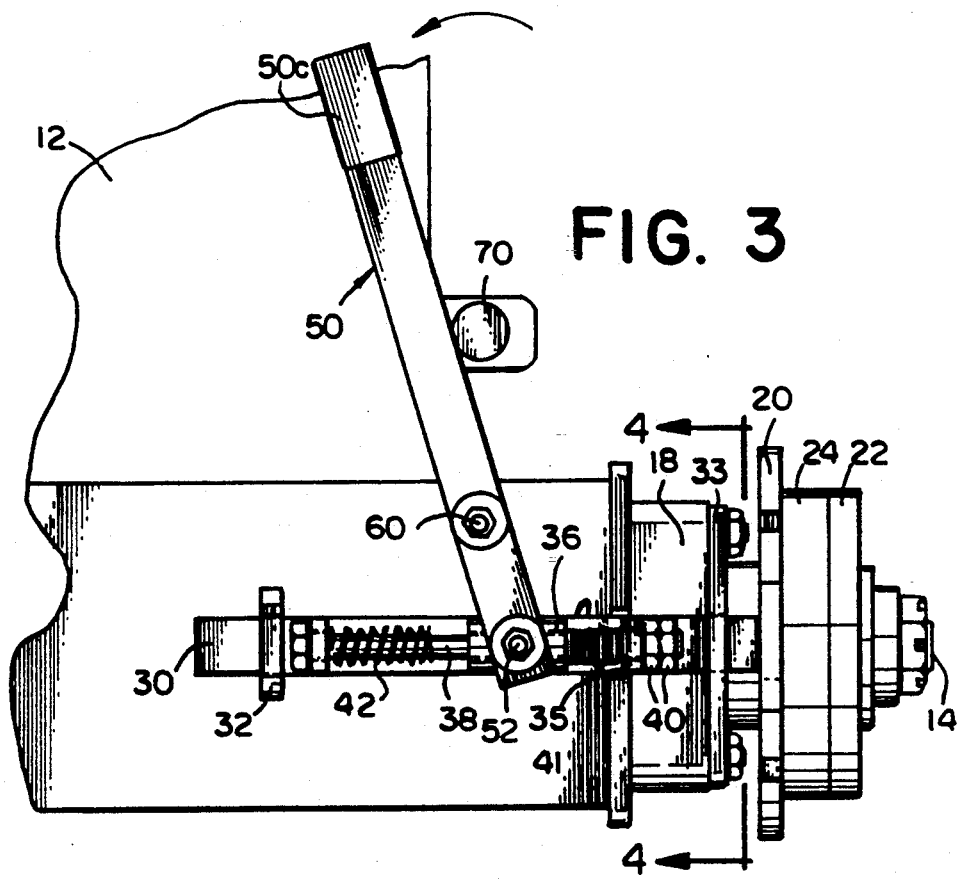
FIG. 3 is a fragmentary front elevational view of the parking brake showing the actuator in the park position with the brake slide not yet engaged in the slots of the slotted disc.

As seen in FIGS. 2 and 3, the parking brake includes a pin brake assembly, two pin brake supporters, a brake actuator assembly, and a disc brake assembly. The pin brake assembly comprises a brake slide 30 with a pin portion 30a designed to move into and out of engagement with the passages 20a of a brake disc 20. The disc passages 20a are disposed in a circle circumferentially of the axle 14. The pin portion of the brake slide 30a and the passages of the brake disc 20a are shaped to closely interact with each other and may be of any shape. The brake slide 30 is supported and guided at its opposite ends by parallel guide plates 32 and 33 fixed relative to the chassis 12. Each of the guide plates 32 and 33 has an aperture 32a and 33a, respectively, through its distal end corresponding to the shape and size of the brake slide 30 to slidably guide the slide 30 for linear movement perpendicular to the plates 32 and 33 and parallel to the axle 14. Guide plate 32 is fixed perpendicular to the chassis of the lift truck by welding or other means. Guide plate 33 is bolted or otherwise fixed to the drive motor 18 of the lift truck closely adjacent the brake disc 20.

In accordance with the invention, the pin brake assembly includes a spring-loaded buffer assembly for displacing the slide 30 into and out of engagement with the disc 20. To this end, parallel spring seats 34 and 35 are fixed perpendicular to the brake slide 30 and extend outwardly from the brake slide 30 between the guide plates 32 and 33. Each spring seat has an aperture to receive an elongated bolt 38 which spans between the spring seats. The bolt 38 is secured in place by nuts 40.

A spring sleeve 36 slides on the shaft of the bolt 38 in a longitudinal direction along the length of the brake slide 30 between the guide plates 32 and 33. Compression springs 41 and 42 surround the shaft 38 on opposite sides of the spring sleeve 36 in between the spring sleeve 36 and the spring seats 34 and 35, respectively. Thus, relative to the brake slide 30, the spring sleeve 36 slides in a longitudinal direction along the shaft 38 in between the spring seats 34 and 35 against the normal bias of the springs 41 and 42.

Figure 4:
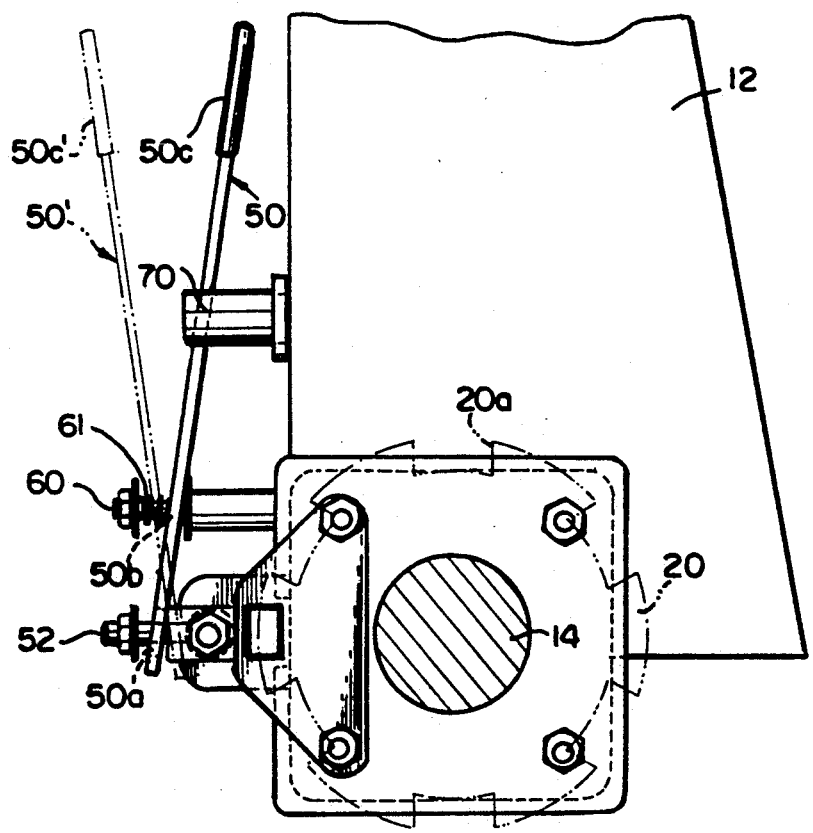
FIG. 4 is a sectional view taken along line 4—4 of FIG. 3 showing the parking brake actuator in the park position with the brake slide out of registry with the slots of the slotted disc.

Referring to FIG. 4, a spring sleeve pivot pin 52 is fixed to and extends radially from the outside surface of the spring sleeve 36 for coupling the pin brake assembly to the brake actuator assembly. The pivot pin 52 interacts with a brake actuator 50 for displacing the brake slide 30 through the guide plates 32 and 33.

In one embodiment of the invention, the brake actuator 50 comprises a lever pivotally-mounted to the chassis, a first aperture at its medial portion 50b about which the lever pivots on a brake actuator pivot pin 60 fixed to the chassis of the lift truck. The lever has a hand grip or operator 50c at its upper end for manually rotating the lever and a second aperture at its lower end 50a for interaction with the pin brake assembly. The aperture 50a is slotted to receive the spring sleeve pivot pin 52. When rotated clockwise as shown in FIG. 2, the brake actuator 50 displaces the spring sleeve pivot pin 52 which, in turn, as described in detail below, tends to move the pin portion 30a of the brake slide 30 from an engaged position penetrating a passage in the brake disc 20, to a disengaged position spaced away from the brake disc.

The brake actuator 50 is loosely secured to the spring sleeve pivot pin 52 by a washer and nut threaded to cooperate with the pivot pin 52. The brake actuator 50 is able to rotate about the spring sleeve pivot pin 52 relative to the spring sleeve 36. The brake actuator 50 is secured to the actuator pivot pin 60 by a compression spring 61, washer and nut. The compression spring 61 allows the brake actuator 50 to slide linearly outward along the length of the actuator pivot pin 60 as shown in the broken lines 50' upon the application of an appropriate force against the spring 61, so that the actuator 50 may rotate about the actuator pivot pin 60 relative to the fork lift chassis 12.

Figure 5:
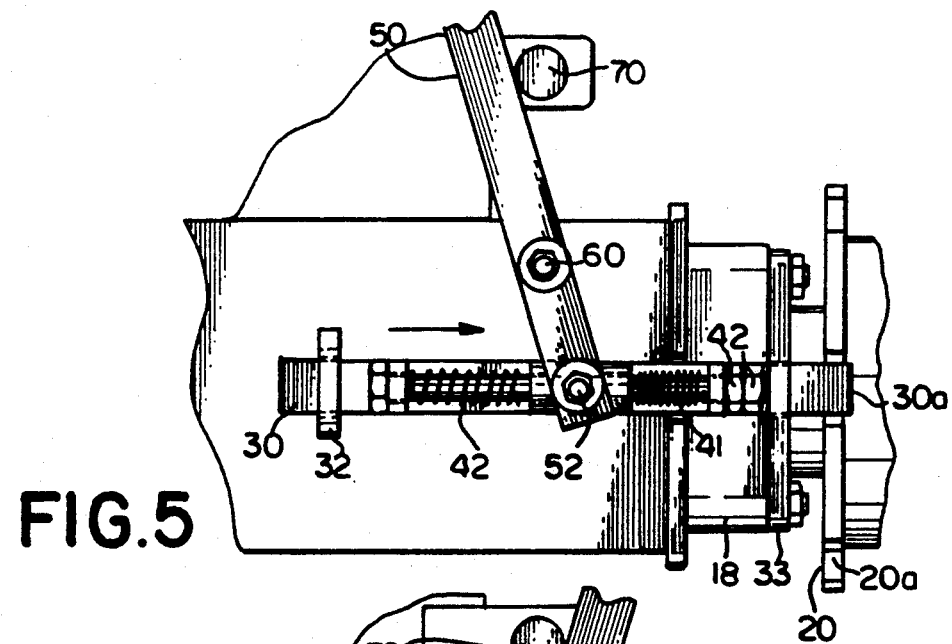
FIG. 5 is a front elevational view of the parking brake showing the actuator in the park position with the brake slide engaged with the slotted disc.
Figure 6:
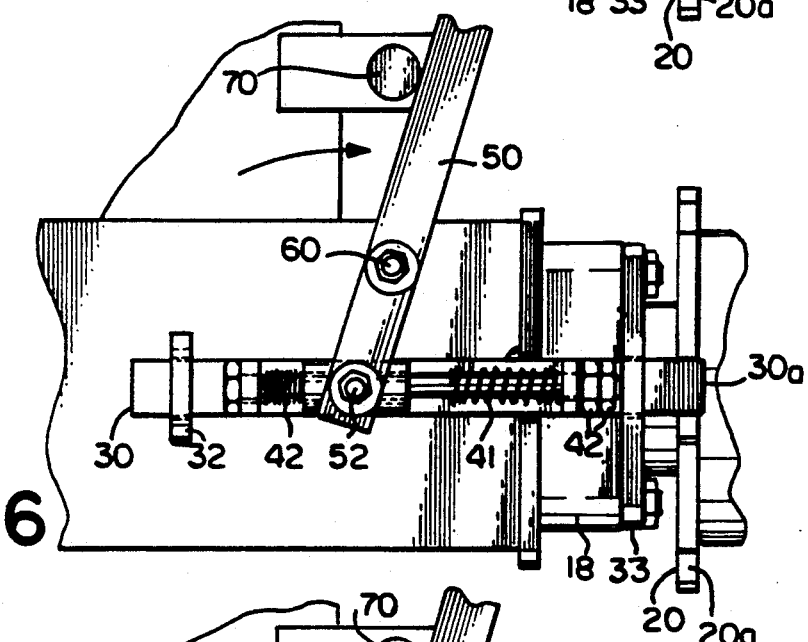
FIG. 6 is a front elevational view of the parking brake showing the actuator in the release position with the brake slide still engaged with the slotted disc.
Figure 7:
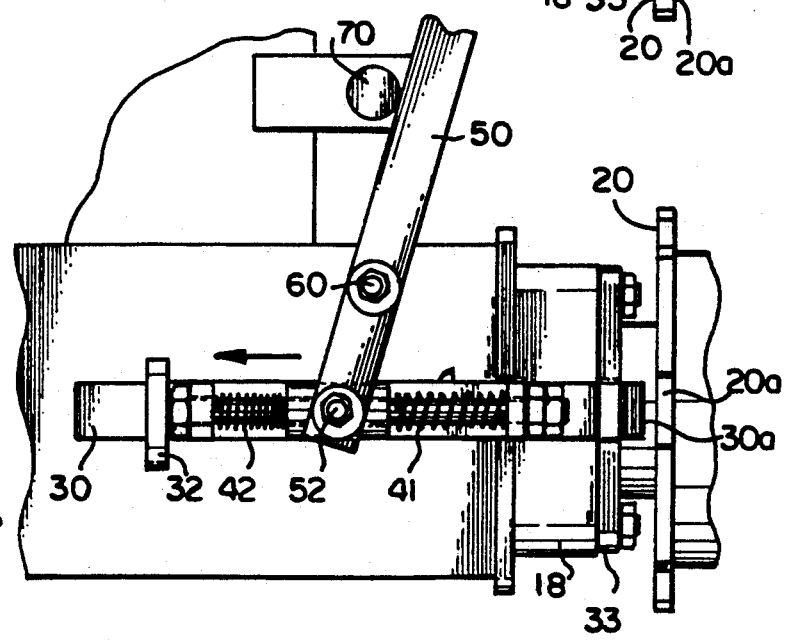
FIG. 7 is a front elevational view of the parking brake showing the actuator in the release position with the sliding bar disengaged from the slotted disc.

The brake actuator 50 may be locked in one of two positions by an abutment in the normal path of movement of the lever 50 between its two locked positions. A brake locator stop 70 is fixed to the lift truck chassis along the actuator's normal path of movement. As illustrated in FIGS. 5, 6 and 7, the brake actuator 50 can be rotated and located in two positions corresponding to the "release" and "park" modes of the brake. To avoid the brake locator stop and move the actuator between modes, the lever must simultaneously be rotated about and moved linearly along the brake actuator pivot pin 60. While the brake actuator is at rest in either of its two modes, the compression spring 61 pushes the brake actuator 50 to its normal position and prevents the actuator from moving past the brake locator 70.

The disc brake assembly comprises a brake disc 20 transverse to the axle 14 and coupled to the wheel 10. The brake disc has a series of axial passages disposed in a circle circumferentially of the axle. The passages are designed to receive the pin portion 30a of the brake slide 30 when the pin portion of the brake slide is in precise alignment with one of the passages. The brake disc 20 is fixed to a wheel hub 22 via a hollow spacer 24. The disc brake assembly is mounted on the drive motor shaft 14 and the wheel 10 is bolted to this assembly.

In operation, the parking brake assembly is in one of four different modes depending on the operation of the lift truck. As illustrated in FIGS. 3 and 4, when the lift truck is stopped for parking, the operator must rotate the brake actuator 30 counterclockwise to the "park" position relative to the actuator locator 70 to apply the parking brake. The brake actuator pushes the spring sleeve 36 to the right and compresses the spring 41. The load created by compression of the spring 41 pushes the brake slide 30 to the right through the guide plates 32 and 33.

In the brake assembly's first mode, the brake actuator is in the "park" position and the brake slide is "disengaged". In this mode, since none of the apertures on the brake disc 20 and the brake slide 30 are in alignment, the brake slide 30 will not engage the brake disc. Rather, the brake slide impinges on the solid part of the brake disc due to the load created by the compressed spring 41. In this mode, the buffer assembly provides a delay in displacement of the pin portion of the slide into one of the passages 20a until a passage is in precise alignment with the slide.

The operator jogs the lift truck to rotate the brake disc 20 until an aperture is in precise alignment with the brake slide. Once the brake disc and brake slide are in precise alignment, the constant force from the compressed spring automatically pushes the brake slide into engagement with the brake disc and into the brake assembly's second mode.

In the brake assembly's second mode, the brake actuator is in the "park" position and the brake slide is "engaged", as illustrated in FIG. 5. Once the brake slide is engaged, further rotation of the brake disc 20 is prevented by the brake slide when the disc impinges on the brake slide.

To "release" the brake, the operator must rotate the brake actuator clockwise past the stop 70 to the "release" position relative to the actuator locator stop 70. The brake actuator displaces the spring sleeve to the left which compresses the spring 42 against its normal bias. The load created by compression of the spring 42 tends to displace the brake slide 30 to the left through the guide plates 32 and 33. If the lift truck is parked on an incline, the brake disc 20 impinges on and exerts a high frictional binding force on the brake slide 30. If this force is greater than the force exerted on the brake slide by the compressed spring 42, the brake slide will not slide to the left and disengage the brake disc.

In the brake assembly's third mode, the brake actuator is in the "release" position but the brake slide is still "engaged" due to the high frictional force exerted on the slide by the disc, as illustrated in FIG. 6. In this mode, the force exerted on the brake slide by the normal bias of the compression spring 42 is less than the force exerted on the brake slide by the brake disc. The buffer assembly provides a delay in displacement of the pin portion of the slide out of one of the passages 20a until the frictional force on the slide has been sufficiently reduced by jogging the lift truck and rotating the brake disc 20 in the direction approaching precise alignment with the slide 30.

The disc brake may exert an extremely high frictional force on the brake slide proportional to the gradient of the incline. Jogging the lift truck up the incline will eventually reduce the frictional force on the brake slide to a point where the force of the normal bias of the compression spring 42 on the brake slide becomes greater than the impinging force of the brake disc on the brake slide. At this point, the force of the compression spring 42 displaces the brake slide to the left and automatically disengages the brake disc.

In the brake assembly's fourth mode, the brake actuator is in the "release" position and the brake slide is "disengaged" as illustrated in FIG. 7. In this mode, the lift truck can travel freely in its normal course of operation.

In a modification of the present invention (not shown), an hydraulic cylinder is attached to the actuator arm operable between extended and retracted limit positions to displace the spring sleeve. The hand grip 50c and the locator stop 70 are replaced by the hydraulic cylinder which serves the same function of positioning the actuator arm for engaging and disengaging the brake slide with the brake disc. The cylinder shaft is moved by applying hydraulic pressure from the machine's hydraulic power unit to the hydraulic cylinder. The cylinder shaft, in turn, moves the brake actuator, such as a lever similar to the lever 50, which displaces the brake slide to the left or right to either engage or disengage the brake under the control of a spring-loaded buffer assembly.

The spring-loaded pin brake assembly provides significant advantages over the prior art. For example, with a conventional pin brake, the operator of the lift truck must operate the travel mode and brake mode simultaneously until the brake is engaged or disengaged if the brake slide and disc passages are not in precise alignment. In the present invention, the compressed springs 41 and 42 automatically apply a constant force on the sliding bar causing the pin portion 30 to engage or disengage the parking brake automatically when the brake slide and brake disc are in precise alignment. In this manner, wear on the internal components of the parking brake assembly is reduced by eliminating the need for repeated unsuccessful attempts to engage or disengage the brake.

The present invention embodying a hydraulic cylinder is also particularly advantageous over prior art brakes using an hydraulic cylinder. In a prior art brake using an hydraulic cylinder, a very high radial load is created on the shaft of the ram or piston when the shaft and brake disc are engaged and the brake disc impinges on the shaft. The radial load, transverse to the shaft, causes uneven wear on the seal inside the cylinder. In this embodiment of the present invention, a high load transverse to the brake slide is similarly created when the brake disc impinges on the brake slide, but the high transverse load is not transmitted to the internal cylinder components. The transverse load is supported by the brake slides. Thus, wear on the internal components of the hydraulic cylinder are greatly reduced.

Another embodiment of the present invention is a dual automatic parking brake, as illustrated in FIGS. 8 and 9. The dual automatic parking brake comprises two identical parking brakes, each disposed laterally on the front of the chassis. This embodiment of the invention comprises two of each of the components of the aforementioned manual parking brake, except the actuator 50, locator stop 70 and compression spring 61 have been replaced with an hydraulic cylinder 180 and an actuator linkage comprising a brake actuator 150 pivotally mounted to the chassis so as to simultaneously engage and disengage both brakes which are interconnected through the actuator linkage.

A piston ram 151 of a hydraulic cylinder 180 is linked to and rotates the brake actuator 150. Movement of the ram is controlled by applying hydraulic pressure from the machine's hydraulic power unit selectively to opposite ends of the hydraulic cylinder through ports 180a and 180b.

In this embodiment, the brake actuator 150 is pivotally connected at one end 160 to the ram 151, one end of a tension spring 158, and an actuator link 154 which is pivoted to a sleeve 136 of a buffered slide 130 cooperable with a brake disc 120 at one side of the lift truck chassis 112. The tension spring is fixed to the chassis at its opposite end 162 to bias the linkage toward engaging the slide 136 with the disc 120. The opposite end of the brake actuator 150 also is pivotally connected at 170 to an actuator link 152. The actuator link 152 is pivotally connected to a spring sleeve 236 on the slide 230 of a brake assembly cooperable with a brake disc 220.

FIG. 9 illustrates the dual automatic parking brake linkage in a disengaged mode. As shown in FIG. 8, to disengage the parking brake, hydraulic pressure is applied to the left port 180a of the brake cylinder. The piston ram 151 rotates the brake actuator 150 clockwise which in turn displaces actuator linkages 152 and 154 and their respective brake slides 130 and 230 out of engagement with the brake discs 120 and 220, as shown in FIG. 9.

FIG. 8 illustrates the dual automatic parking brake in an engaged mode. During clockwise rotation of the actuator bar 150, the tension spring 158 is extended. When hydraulic pressure is released, the tension spring 158 rotates the pivot bar 156 counterclockwise. The brake slides are displaced into engagement with the brake discs by the linkage through the buffered connection provided by the sleeves 136 and 236 on the slides 130 and 230.

This embodiment of the present invention may be modified by use of an hydraulic brake cylinder designed with an internal compression spring for extension and hydraulic retraction, or by hydraulic controls to bias the linkages toward the engaged positions. Such modification eliminates the need for the external tension spring 158 and would also be applicable to the single brake design.

In each of the aforementioned embodiments, the parking brake need not engage in all four parking modes each time the parking brake is applied and released. For instance, if the parking brake is applied while the lift truck is at rest on a level surface and the brake slide is engaged, the frictional force created by the weight and tires of the lift truck prevent the lift truck from moving or rolling. Since the lift truck does not roll, the brake disc does not bind or apply a frictional drag on the brake slide. Thus, the brake slide will instantly disengage from the brake disc when the actuator is rotated to the "release" position.

While particular embodiments of the present invention have been herein illustrated and described, it is not intended to limit the invention to such disclosures but changes and modifications may be made therein and thereto within the scope of the following claims.

We claim:

1. For a lift truck having a chassis with an elevating platform, a wheel supporting said chassis for land travel, an axle carried by said chassis and supporting said wheel on said chassis for rotation, and means to drive the wheel; a parking brake assembly to prevent rotation of said wheel relative to said chassis comprising a brake disc transverse to said axle and coupled to said wheel and having a series of axial passages disposed in a circle circumferentially of said axle,
   a brake slide having a pin portion at one end operable to engage in said any one of said passages,
   guide means on said chassis to afford longitudinal sliding displacement of said brake slide parallel to said axle so as to allow said pin portion to move into and out of engagement with a passage in said brake disc when the passage is aligned with said pin, said pin being freely slidable within said passage when it is precisely aligned with said brake slide, and binding with said passage when said passage is out of precise alignment with said slide,
   an actuator movable between a "park" limit position and a "release" limit position for displacing said brake slide to actuate said brake pin between an engaged position penetrating a passage in said brake disc and a disengaged position spaced from said brake disc, and
   a spring-loaded buffer assembly coupling said actuator to said brake slide to allow a delay in displacement of said brake slide after movement of said actuator to one of its limit positions until said pin portion is freely slidable within one of said passages.

2. A parking brake assembly according to claim 1 wherein said guide means include a first guide plate mounted on said chassis closely adjacent said brake disc and with a first aperture providing a guideway for said brake slide adjacent said pin portion, and a second guide plate spaced parallel to said first guide plate remote from said brake disc and said pin portion, and having a second aperture providing a guideway for said brake slide, said buffer assembly engaging said brake slide intermediate said guide plates.

3. A parking brake assembly according to claim 2, wherein said buffer assembly comprises a sleeve slidable longitudinally relative to said brake slide intermediate said first and second guide plates, a first and a second spring seat, each anchored to said brake slide between one of said guide plates and said sleeve, a first coil spring partially compressed between the first spring seat and said sleeve, and a second coil spring partially compressed between said sleeve and the second spring seat, said springs and sleeve affording said delays in displacement of said pin portion into and out of one of said passages.

4. A parking brake assembly according to claim 3, wherein said actuator in said "park" position urges said sleeve toward said first guide plate against the bias of said first spring and in said "release" position urges said sleeve toward said second guide plate.

5. A parking brake assembly according to claim 4, wherein said actuator includes a lever pivoted to said chassis at a medial portion of the lever, coupled to said sleeve at one end, and having an operator at the other end.

6. A parking brake assembly according to claim 5, wherein said operator comprises a hand grip and means to lock the actuator alternatively in the "park" and "release" limit positions.

7. A parking brake assembly according to claim 6, wherein said locking means comprises an abutment in the normal path of movement of the lever between said alternative positions, and spring relief means to afford manual displacement of said lever out of said normal path of movement when said sleeve is being displaced.

8. A parking brake assembly according to claim 5, wherein said operator comprises a fluid-actuated ram connected to said lever and operable between extended and retracted limit positions to displace said sleeve.

9. A parking brake assembly according to claim 3, for use with a lift truck in which the axle is elongated with a wheel at each end and a brake disc adjacent each wheel, said brake assembly including a slide for each brake disc, said spring-loaded buffer assembly having a sleeve for each brake slide, said actuator being coupled to both sleeves to displace both of said brake slides.

10. A parking brake assembly according to claim 9 wherein said actuator comprises a lever pivoted to said chassis at a medial position of the lever and having opposite ends coupled respectively to the sleeves associated with said brake disc.

11. A parking brake assembly according to claim 10 wherein said actuator further comprises a fluid-actuated ram coupled to said lever and operable between extended and retracted limit positions to displace said sleeve longitudinally of its associated slide.

12. A parking brake assembly according to claim 11 including means normally biasing said ram to the limit position tending to displace the slide pin portion into one of said disc passages.

13. A parking brake assembly according to claim 1 wherein said spring-loaded buffer assembly allows delay in displacement of said slide after movement of said actuator to the other of its limit positions until said pin portion is freely slidable within one of said passages.

* * * * *